(12) United States Patent
Sekigawa

(10) Patent No.: US 7,817,537 B2
(45) Date of Patent: Oct. 19, 2010

(54) MATRIX SWITCHER AND METHOD OF CONTROLLING MATRIX SWITCHER

(75) Inventor: Kaoru Sekigawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 11/897,805

(22) Filed: Aug. 30, 2007

(65) Prior Publication Data

US 2008/0060031 A1 Mar. 6, 2008

(30) Foreign Application Priority Data

Sep. 4, 2006 (JP) ............................ P2006-239307

(51) Int. Cl.
*H04L 1/00* (2006.01)
(52) U.S. Cl. ...................... 370/217; 370/216; 370/218; 370/219; 370/220; 370/221; 370/225; 370/226; 370/360; 714/4
(58) Field of Classification Search ......... 370/216–221, 370/225–228, 360; 714/4
See application file for complete search history.

(56) References Cited

U.S. PATENT DOCUMENTS 5,530,434 A * 6/1996 Kanda ........................ 340/2.2
5,583,796 A * 12/1996 Reese ......................... 702/185
5,953,333 A * 9/1999 Fox et al. .................... 370/360
7,120,112 B1 * 10/2006 Metzger et al. ............. 370/219
7,127,633 B1 * 10/2006 Olson et al. .................... 714/4

FOREIGN PATENT DOCUMENTS

| JP | 5 328216 | 12/1993 |
| JP | 3094654 | 8/2000 |
| JP | 2002 77253 | 3/2002 |
| JP | 2004 186899 | 7/2004 |

* cited by examiner

*Primary Examiner*—William Trost, IV
*Assistant Examiner*—Toan D Nguyen
(74) *Attorney, Agent, or Firm*—Frommer Lawrence & Haug LLP; William S. Frommer; Ellen Marcie Emas

(57) ABSTRACT

A matrix switcher includes a switcher unit having connection switches provided at intersections of input signal lines and output signal lines and a control unit having a main controller and a backup controller. The backup controller operates a Web server program to transfer a setup command to the main controller upon receiving the setup command. The main controller executes: processing of switching a connection relation between the input signal lines and output signal lines in the switcher unit; processing of transferring a switching command to another matrix switcher upon receiving the switching command for another switcher; processing of setting up the matrix switcher upon receiving the setup command for the switcher; and processing of transferring the setup command to another matrix switcher upon receiving the setup command for another switcher.

8 Claims, 9 Drawing Sheets

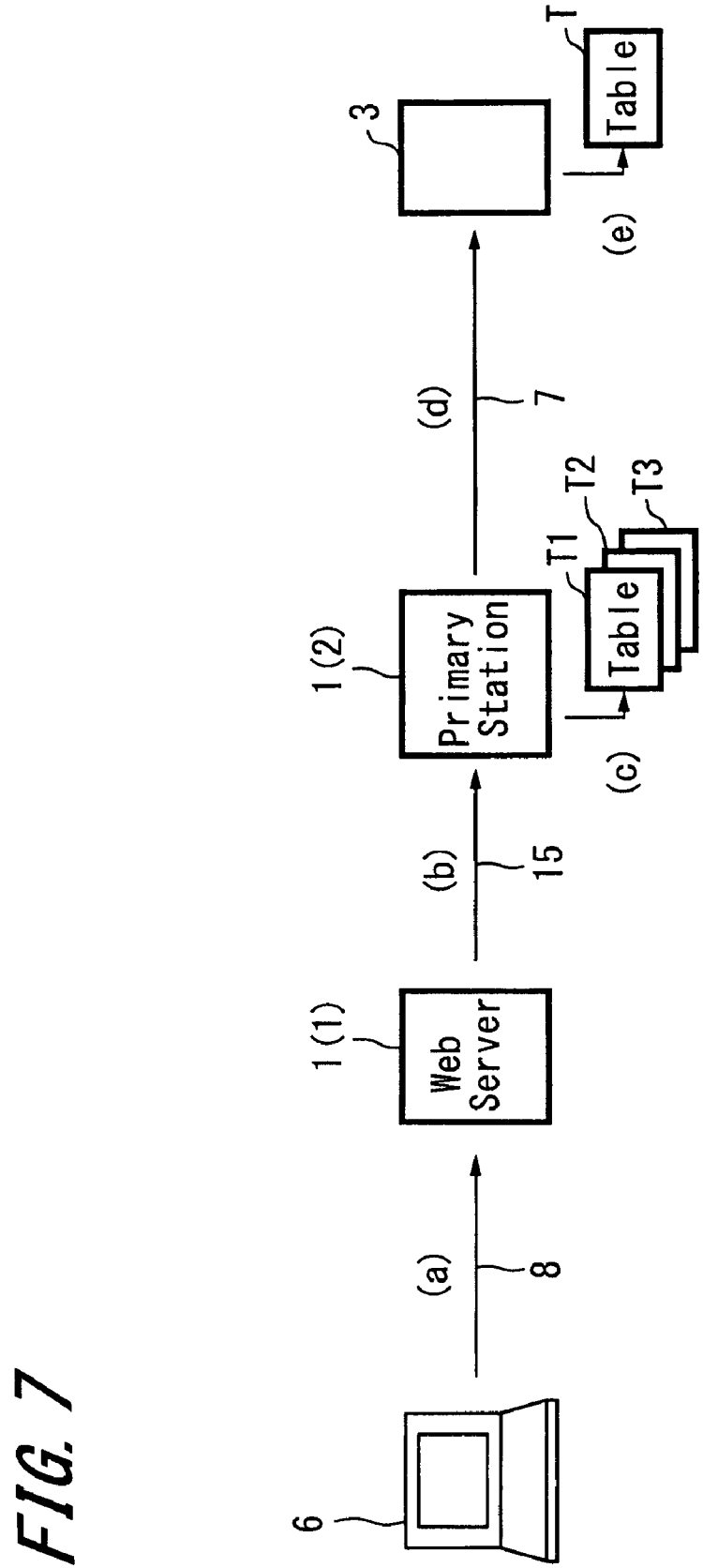

FIG. 8

```xml
<?xml version="1.0" encoding="UTF-8"?>
<SOAP-ENV:Envelope
xmlns:SOAP-ENV="http://schemas.xmlsoap.org/soap/envelope/"
xmlns:SOAP-ENC="http://schemas.xmlsoap.org/soap/encoding/"
xmlns:xsi="http://www.w3.org/2001/XMLSchema-instance"
xmlns:xsd="http://www.w3.org/2001/XMLSchema"
xmlns:ns2="x58SecondaryStationConfigurationSoapBinding"
xmlns:ns1="http://xmlns.sony.net/pro/switcher/x58secondarystation/configurationservice">
<SOAP-ENV:Body id="_0">
>
<SetCnoReq xmlns="" xmlns:ns1="http://xmlns.sony.net/pro/switcher/x58secondarystation/configurationservice">
 <Sbus xsi:type="ns1:SbusCnoType" second="0" third="0">
  <Slot xsi:type="ns1:CnoSlot">
   <Side xsi:type="ns1:CnoType" no="0">
    <Type></Type>
    <Ref xsi:type="ns1:CnioRefType" ena=""></Ref>
    <Video xsi:type="ns1:CnoVideoType" ena="">
     <Form xsi:type="ns1:partType"></Form>
     <Rec xsi:type="ns1:partType"></Rec>
    </Video>
   </Side>
  </Slot>
 </Sbus>
</SetCnoReq>
</SOAP-ENV:Body>
</SOAP-ENV:Envelope>
```

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 xmlns:ns2="SecondaryStationConfigurationSoapBinding"
 xmlns:ns1="http://xmlns.sony.net/pro/switcher/secondarystation/configurationservice">
<SOAP-ENV:Body id="_0">
>
<SetCnoReq xmlns="http://xmlns.sony.net/pro/switcher/secondarystation/configurationservice">
  <Slot xsi:type="ns1:CnoType">
    <Type></Type>
    <Rev></Rev>
    <Ref xsi:type="ns1:CnioRefType" ena=""></Ref>
    <Video xsi:type="ns1:CnoVideoType" ena="">
      <Form xsi:type="ns1:partType"></Form>
      <Rec xsi:type="ns1:partType"></Rec>
    </Video>
    <Audio xsi:type="ns1:CnoAudioType" ena="">
      <Effect xsi:type="ns1:AudioEffectType"></Effect>
      <CRCReg></CRCReg>
    </Audio>
    <Tc xsi:type="ns1:TcType" ena="">
      <Form xsi:type="ns1:partType"></Form>
    </Tc>
  </Slot>
</SetCnoReq>
</SOAP-ENV:Body>
</SOAP-ENV:Envelope>
```

(A) →

MATRIX SWITCHER AND METHOD OF CONTROLLING MATRIX SWITCHER

CROSS REFERENCES TO RELATED APPLICATIONS

The present invention contains subject matter related to Japanese Patent Application JP 2006-239307 filed in the Japanese Patent Office on Sep. 4, 2006, the entire contents of which being incorporated herein by reference.

BACKGROUND OF THE INVENTION

1. Field of the Invention

The present invention relates to a matrix switcher used in broadcasting facilities or the like, and particularly relates to the matrix switcher having an interface for a general-purpose network.

2. Description of the Related Art

Matrix switchers are apparatuses to perform switching of a video signal, an audio signal, a control signal of a device and the like in broadcasting facilities (for example, refer to Japanese Patent No. 3094654 and Japanese Unexamined Patent Application Publication No. 2002-77253). A matrix switcher basically includes a switcher unit and a control unit. The switcher unit includes a plurality of input signal lines and a plurality of output signal lines intersected, and a connection switch made of a semiconductor device is provided at each intersection. An operator performs a switching operation on the matrix switcher by using a dedicated remote controller, and the control unit switches a connection relation between the input signal lines and output signal lines in the switcher unit upon receiving a switching command from the remote controller.

When a program is on the air or recorded, video/audio signals output from a number of video cameras and microphones in a studio or at a remote scene, video/audio signals reproduced from a VTR and a video server, signals for controlling devices (e.g., program transmission apparatus and VTR), and the like are input to the switcher unit in the matrix switcher where destinations of those input signals are switched.

Broadcasting facilities or the like typically use a plurality of matrix switchers in combination such that a matrix switcher is used with newly installed another matrix switcher. In such case, typically the matrix switchers and the above-described remote controller have been connected to a dedicated communication line (referred to as "S-BUS") as described in paragraphs [0023] through [0026], for example, of Japanese Patent No. 3094654. All the apparatuses connected on the S-SUB are categorized into one "primary station" and the remaining "secondary stations", in which the primary station performs communication with respective secondary stations by polling and the primary station also relays communication performed between the secondary stations. Further, a terminal apparatus connected to the S-BUS has typically performed setup of a matrix switcher.

SUMMARY OF THE INVENTION

On the other hand, a general-purpose network such as Ethernet® has been widely used in recent years in broadcasting facilities or the like. Accordingly, there has been increasing such a demand that a setup operation of a matrix switcher is performed using a personal computer or the like via a general-purpose network while a switching operation of the matrix switcher is performed using a dedicated remote controller as before.

A matrix switcher of late may include not only an interface for S-BUS but also an interface for a general-purpose network, however, a matrix switcher in the past may not include an interface for a general-purpose network. Therefore, it is difficult to perform a setup operation of a matrix switcher in the past via a general-purpose network without making any modification.

The following configuration may be provided as a system configuration with which the setup operation of such matrix switcher in the past can be performed via a general-purpose network. More specifically, a matrix switcher having an interface for a general-purpose network is set as a primary station on S-BUS, and a processor included in a control unit of the matrix switcher operates a Web server program (httpd). Further, the Web server transmits data on current setup content of the primary station and data on current setup content of a secondary station provided on the S-BUS to a Web browser on the general-purpose network (data on the secondary station is transmitted after the data is converted from an S-BUS protocol to a general-purpose network protocol). In addition, upon receiving by the Web server a setup command addressed to the primary station and the secondary station from the Web browser on the general-purpose network, the setup of the primary station is performed and the setup command addressed to the secondary station is transmitted to the secondary station on the S-BUS after converting the setup command into the S-BUS protocol.

According to the above-described configuration, a Web browser for a personal computer or the like is used to access the Web server and to perform the setup operation of both the matrix switcher having an interface for a general-purpose network and the matrix switcher in the past not having such interface.

However, there are problems in the case where a processor included in a control unit of a matrix switcher that is the primary station performs processing by functioning as the Web server. Since matrix switchers are used for broadcasting or the like, high reliability may be required in order to avoid an occurrence of switching failure during a program being on the air or the like. In addition, the matrix switcher set as the primary station may be required to have such real-time responsiveness that makes the following operations possible. For example, the matrix switcher should complete the switching operation of its own switcher unit (switching processing of the switcher unit executed by the processor in the control unit) within a predetermined period after receiving a switching command addressed to the primary station and transmitted from a remote controller that is the secondary station. In addition, the matrix switcher set as the primary station should complete a transfer of a switching command to another matrix switcher within a predetermined period after receiving the switching command addressed to another matrix switcher of the secondary station and transmitted from the remote controller. Otherwise, signals may not be switched at a timing that the operator intends to perform switching, which causes a delay in the timing of video switching during the program, for example. Further, the processor may have a high load when performing the above-described processing by functioning as the Web server.

Therefore, if one processor executes both the switching/switching-command-transfer processing, for which such high reliability and real-time responsiveness may be required, and the processing performed by functioning as the Web server, a processor of substantially high processing capacity may be required. Further, even if the processor has such high processing capacity, there is a possibility that a failure may occur in the processor due to a load of processing performed serving as the Web server.

On the other hand, typically a backup processor is provided other than a main processor so that the backup processor alternatively executes processing when a failure occurs in the main processor, and such backup processor is also provided in a control unit of a matrix switcher. However, in this regard, the main processor executes both the switching/switching-command-transfer processing and the processing performed by functioning as the Web server, and also the backup processor alternatively executes both the processing described above when a failure occurs in the main processor. Hence, two processors each having substantially high processing capacity are provided, which results in a high cost of the matrix switcher and is economically disadvantageous.

It is desirable to provide an economically advantageous matrix switcher capable of executing switching/switching-command-transfer processing, for which high reliability and real-time responsiveness are required, and processing performed by functioning as the Web server. The matrix switcher performs the setup operation of both the matrix switcher having an interface for a general-purpose network and the matrix switcher not having such interface via the general-purpose network using a Web browser in a personal computer.

A matrix switcher according to an embodiment of the present invention includes a switcher unit having connection switches respectively provided at intersections formed by a plurality of input signal lines and a plurality of output signal lines and a control unit configured to control the switcher unit. The control unit includes a main controller and a backup controller each having an interface for a general-purpose network and an interface for a dedicated communication line. The backup controller operates a Web server program to transfer a setup command to the main controller upon receiving the setup command addressed to the matrix switcher and/or another matrix switcher not having the interface for the general-purpose network from a Web browser via the general-purpose network. The main controller executes switching processing, switching command transfer processing, setup processing, and setup command transfer processing. In the switching processing, a connection relation between the input signal lines and output signal lines in the switcher unit is switched upon receiving a switching command addressed to the matrix switcher via a dedicated communication line. In the switching command transfer processing, a switching command is transferred to another matrix switcher via the dedicated communication line upon receiving the switching command addressed to another matrix switcher via the dedicated communication line. In the setup processing, setup to the matrix switcher is performed upon receiving from the backup controller the setup command addressed to the matrix switcher. In the setup command transfer processing, the setup command is converted into a protocol of the dedicated communication line and is transferred to another matrix switcher via the dedicated communication line upon receiving from the backup controller the setup command addressed to another matrix switcher not having the interface for the general-purpose network.

A method of controlling a matrix switcher according to an embodiment of the present invention includes the following steps performed by a matrix switcher that includes a switcher unit having connection switches respectively provided at intersections formed by a plurality of input signal lines and a plurality of output signal lines and a control unit configured to control the switcher unit. The control unit includes a main controller and a backup controller each having an interface for a general-purpose network and an interface for a dedicated communication line. The method of controlling a matrix switcher includes the steps of: transferring a setup command by the backup controller, switching a connection relation, transferring a switching command, setting up the matrix switcher, and transferring a setup command by the main controller. The backup controller operates a Web server program to transfer a setup command to the main controller upon receiving the setup command addressed to the matrix switcher and/or another matrix switcher not having the interface for the general-purpose network from a Web browser via the general-purpose network. The main controller switches the connection relation between the input signal lines and output signal lines in the switcher unit upon receiving a switching command addressed to the matrix switcher via the dedicated communication line. The main controller transfers a switching command to another matrix switcher via the dedicated communication line upon receiving the switching command addressed to another matrix switcher via the dedicated communication line. The main controller sets up the matrix switcher upon receiving from the backup controller the setup command addressed to the matrix switcher. The main controller converts the setup command into a protocol of the dedicated communication line and transfers the setup command to another matrix switcher via the dedicated communication line upon receiving from the backup controller the setup command addressed to another matrix switcher not having the interface for the general-purpose network.

According to the above-described embodiments of the present invention, there is provided a matrix switcher including a control unit having a main controller and a backup controller. The backup controller executes processing by functioning as the Web server, and the main controller executes switching processing and setup processing for the matrix switcher and processing (including protocol conversion) of transferring a switching command and setup command to another matrix switcher when the main controller is operating normally.

In a typical backup system including a main controller and a backup controller, the backup controller only traces data handled in the main controller so that the backup controller prepares for a failure that may occur in the main controller when the main controller is operating normally. Therefore, the backup controller is not executing high load processing although the backup controller has the same processing capacity as the main controller. According to the embodiment of the present invention, the backup controller executes the high load processing by functioning as the Web server. Accordingly, the main controller while maintaining high reliability and real-time responsiveness can execute switching/switching-command-transfer processing, and switching/switching-command-transfer processing are not interrupted even when a failure occurs in the backup controller due to a load of the processing performed by functioning as the Web server.

Further, a backup controller is typically provided. In addition, there is no need for the backup controller and a main controller to be prepared as a controller having high processing capacity and executing both the switching/switching-command-transfer processing and the processing performed by functioning as the Web server. Therefore, a matrix switcher is prevented from being expensive although having the Web server function.

Accordingly, a matrix switcher that can economically execute switching/switching-command-transfer processing, for which high reliability and real-time responsiveness are required, and processing performed by functioning as the Web server is provided. The matrix switcher can perform a setup operation of both the matrix switcher having an interface for a general-purpose network and the matrix switcher not having such interface, using a Web browser in a personal computer or the like via a general-purpose network.

According to an embodiment of the present invention, the following effectiveness can be obtained. Accordingly, a matrix switcher that can economically execute switching/switching-command-transfer processing, for which high reliability and real-time responsiveness are required, and processing performed by functioning as the Web server is provided. The matrix switcher can perform a setup operation of both the matrix switcher having an interface for a general-purpose network and the matrix switcher not having such interface, using a Web browser in a personal computer or the like via a general-purpose network.

BRIEF DESCRIPTION OF THE DRAWINGS

FIG. 7 is a diagram showing a process flow when setting up a secondary station;

FIG. 8 is a diagram showing an example of a setup command of XML protocol for a secondary station; and FIG. 9 is a diagram showing an example of a setup command of XML protocol for a primary station.

DESCRIPTION OF THE PREFERRED EMBODIMENTS

Figure 1:
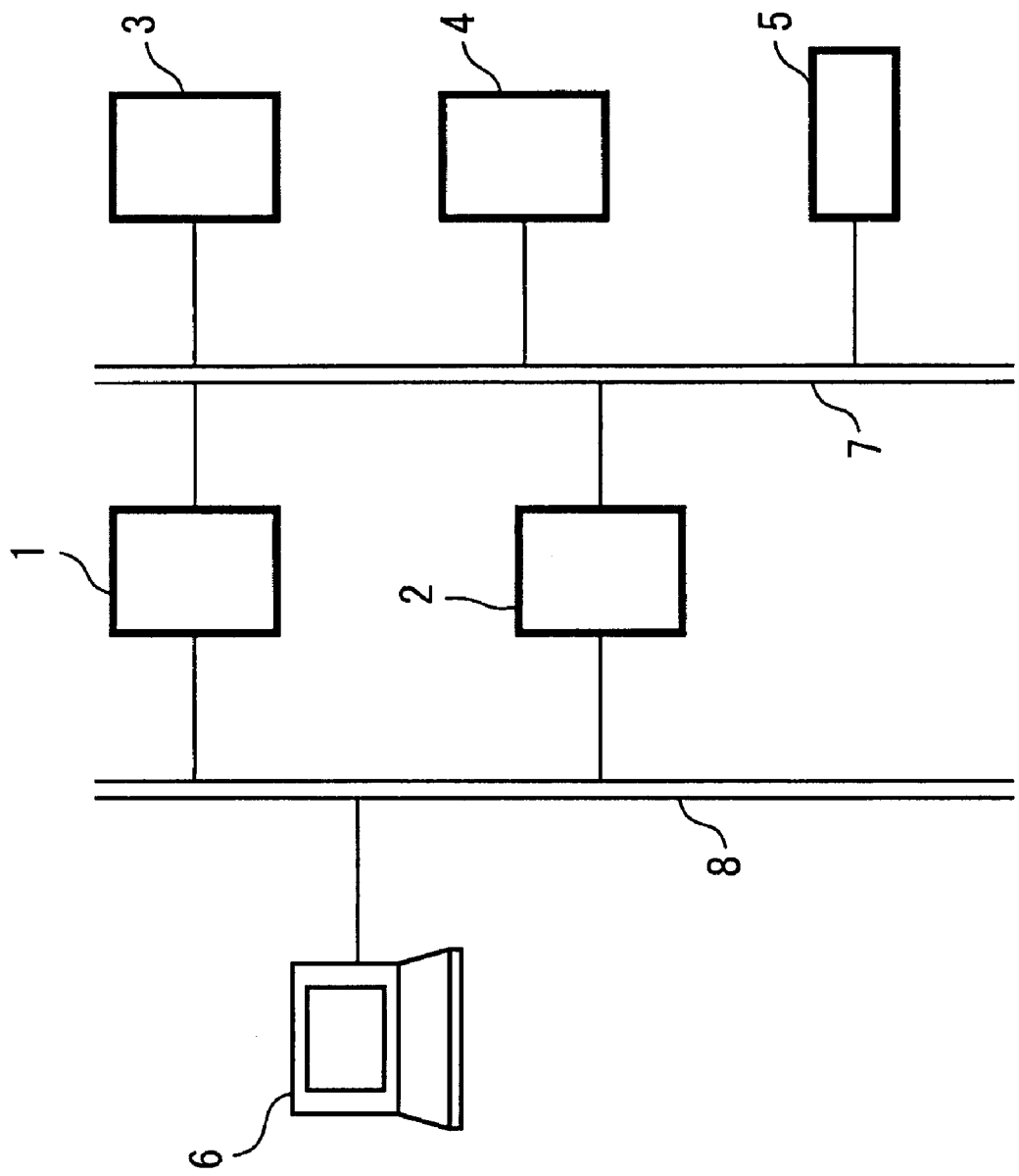
FIG. 1 is a diagram showing an example of an overall configuration of a signal switching system using a matrix switcher to which an embodiment of the present invention is applied.

Hereinafter, an embodiment of the present invention is specifically explained using the accompanied drawings. FIG. 1 is a diagram showing an example of an overall configuration of a signal switching system provided in broadcasting facilities and including a matrix switcher to which an embodiment of the present invention is applied. The signal switching system includes matrix switchers 1 through 4, a remote controller 5, and a personal computer 6.

The matrix switcher 1 and the matrix switcher 2 are the matrix switchers of the same model having an interface for S-BUS that is a dedicated communication line and an interface for Ethernet®. An embodiment of the present invention is applied to the matrix switcher 1.

The matrix switcher 3 and the matrix switcher 4 are matrix switchers of the same model in the past having an interface for S-BUS but not having an interface for Ethernet®.

The remote controller 5 is an apparatus for an operator to perform switching operation of respective matrix switchers 1 through 4 using a plurality of push buttons, and the remote controller 5 has the interface for S-BUS.

The matrix switchers 1 through 4 and the remote controller 5 are connected to S-BUS 7. S-BUS is a bus line that belongs to a LAN (Local Area Network) and that can operate effectively even at a low performance of a transmission distance of 500 m and communication speed (data rate) of 307 Kbps, for example. S-BUS in the form of a bus includes a transmission line formed of a coaxial wire so that each apparatus connected to the S-BUS can use time-divisionally the transmission line.

Figure 2:
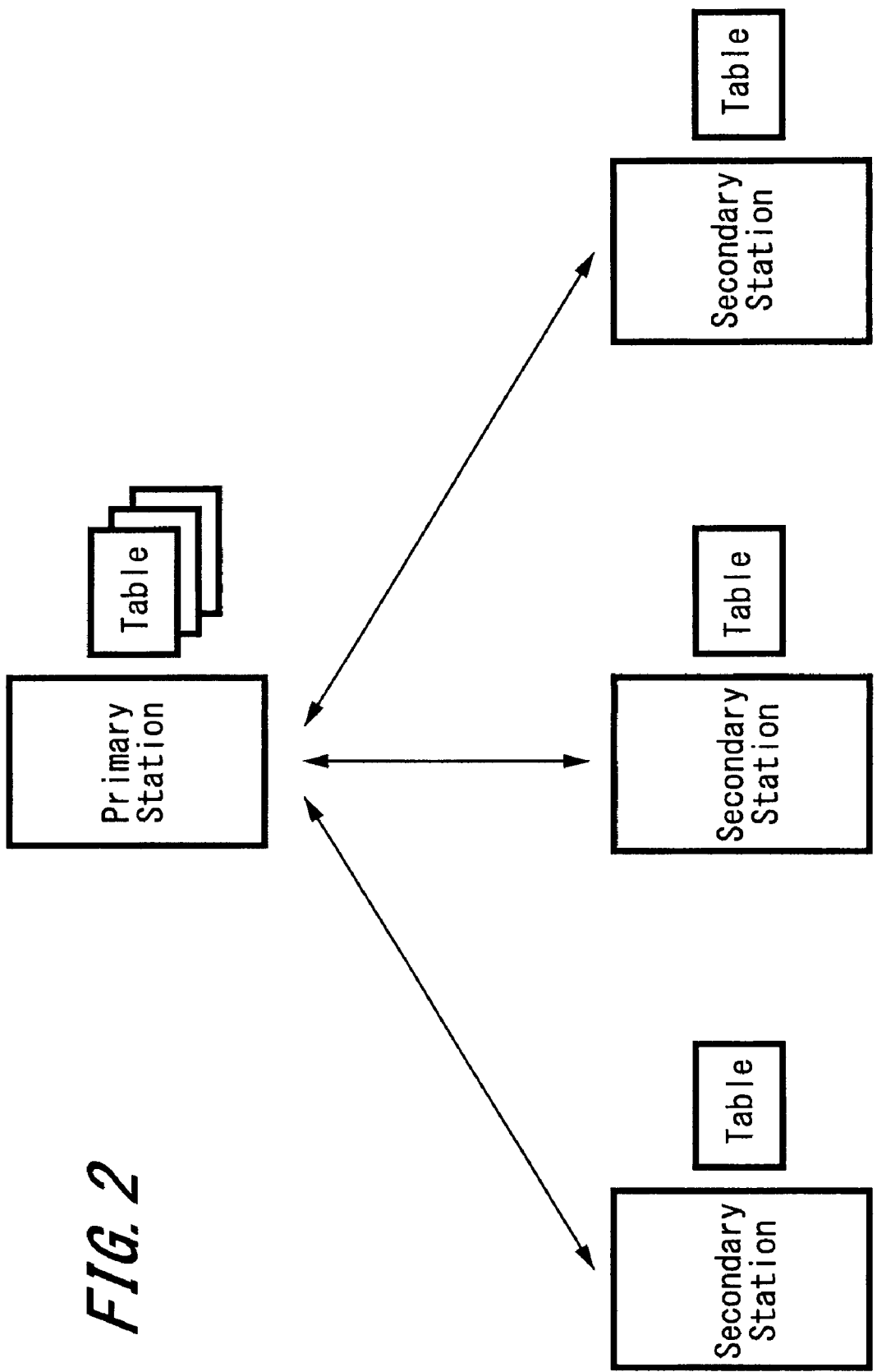
FIG. 2 is a diagram showing setup data storage tables which are prepared in a primary station and a secondary station on S-BUS.

All the apparatuses on the S-BUS are categorized into one primary station and the remaining secondary stations, in which the primary station performs communication with each secondary station by polling and the primary station also relays the communication between the secondary stations. Further, as conceptually shown in FIG. 2, the primary station has a memory including a table region for storing setup content data on each secondary station, and the secondary station also has a memory including a table region for storing setup content data on the secondary station. In the above-described tables, it is predetermined which kind of setup data to be stored on which address. Upon receiving a command to set up a secondary station from the outside, the primary station stores setup content data indicated by the command on the table of the primary station. Further, the primary station transfers the command to the secondary station via S-BUS so that the setup is performed (the setup content data indicated by the command is stored on the table of the secondary station). Further, in the case where the setup contents are automatically changed in the inside of the secondary station (data stored on the table is rewritten), the primary station obtains the changed setup content data from the secondary station via S-BUS so that the data stored on the table of the primary station is rewritten corresponding to the obtained data.

In the switching system shown in FIG. 1, the matrix switcher 1 is the primary station, and the matrix switchers 2 through 4 and the remote controller 5 are the secondary stations.

The matrix switchers 1 and 2 are also connected to Ethernet® 8, and the personal computer 6 is also connected to Ethernet® 8.

Each of the matrix switchers 1 through 4 basically includes a switcher unit and a control unit. The switcher unit includes a plurality of input signal lines and a plurality of output signal lines intersected, and connection switches each made of a semiconductor device provided at respective intersections. When a program is on the air or recorded, video/audio signals output from a number of video cameras and microphones in a studio and at a remote scene, video/audio signals reproduced from a VTR and a video server, signals for controlling devices (e.g., program transmission apparatus and VTR), and the like are input to the switcher unit in the matrix switcher, in which destinations of those signals are switched.

Figure 3:
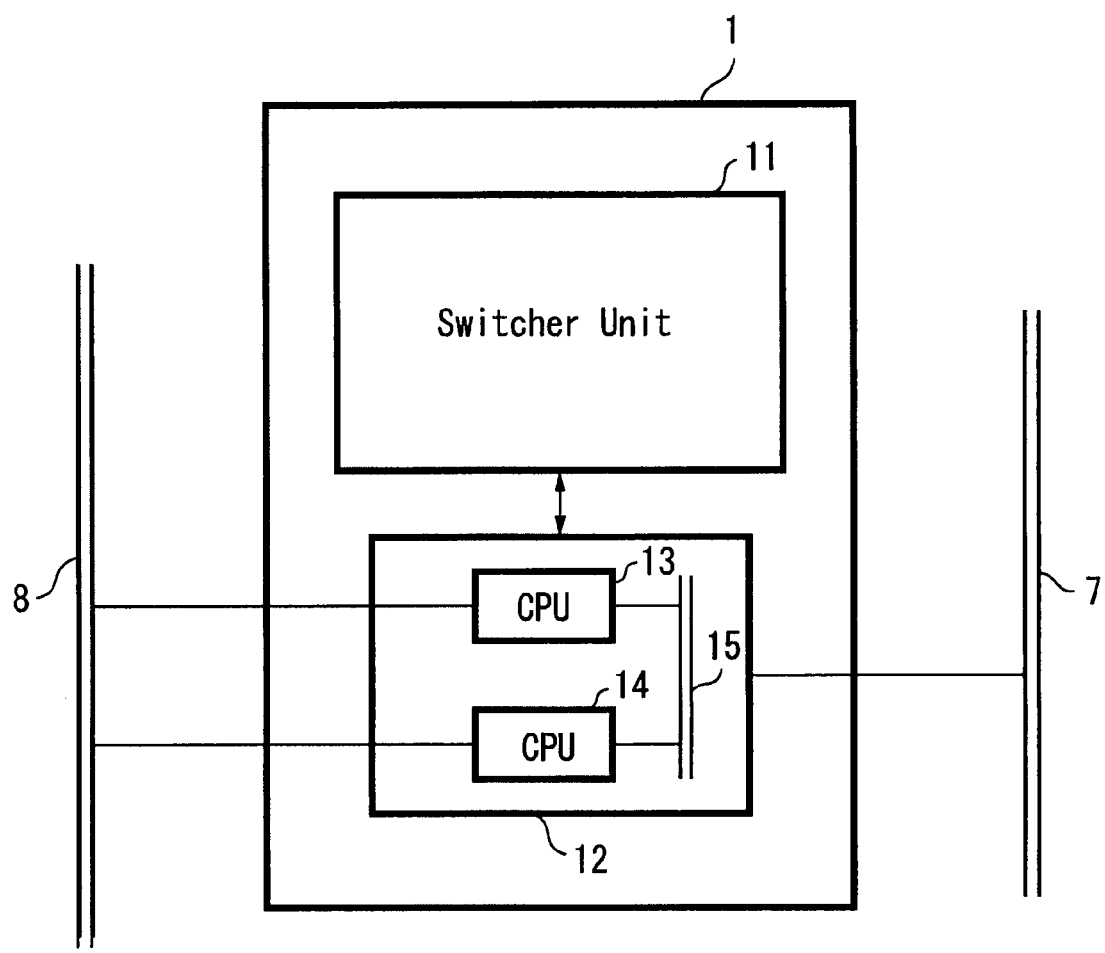
FIG. 3 is a schematic diagram showing a configuration of a matrix switcher to which an embodiment of the present invention is applied.

FIG. 3 is a diagram showing an outline of a configuration of the matrix switcher 1 that is the primary station including a switcher unit 11 and a control unit 12 as described above. The control unit 12 includes a main CPU 13 and a backup CPU 14 respectively connected to the Ethernet® 8 shown in FIG. 1. In addition, Ethernet® 15 provided in the inside of the control unit 12 also connects the CPU 13 and the CPU 14 to each other. Further, the main CPU 13 (backup CPU 14 when a failure occurs in the CPU 13) is connected to the S-BUS 7 shown in FIG. 1.

Similarly to a typical backup CPU, the backup CPU 14 traces data handled in the main CPU 13 via Ethernet® 15, preparing for a failure that may occur in the main CPU 13. In addition to tracing such data, the backup CPU 14 operates a Web server program (httpd) while the main CPU 13 is operating normally.

A Web page provided by the Web server may be used to confirm current setup contents of the respective matrix switchers 1 through 4 and remote controller 5 which are connected to the S-BUS 7 (shown in FIG. 1) and to perform setup operation of the matrix switchers 1 through 4 and remote controller 5.

Figure 4:
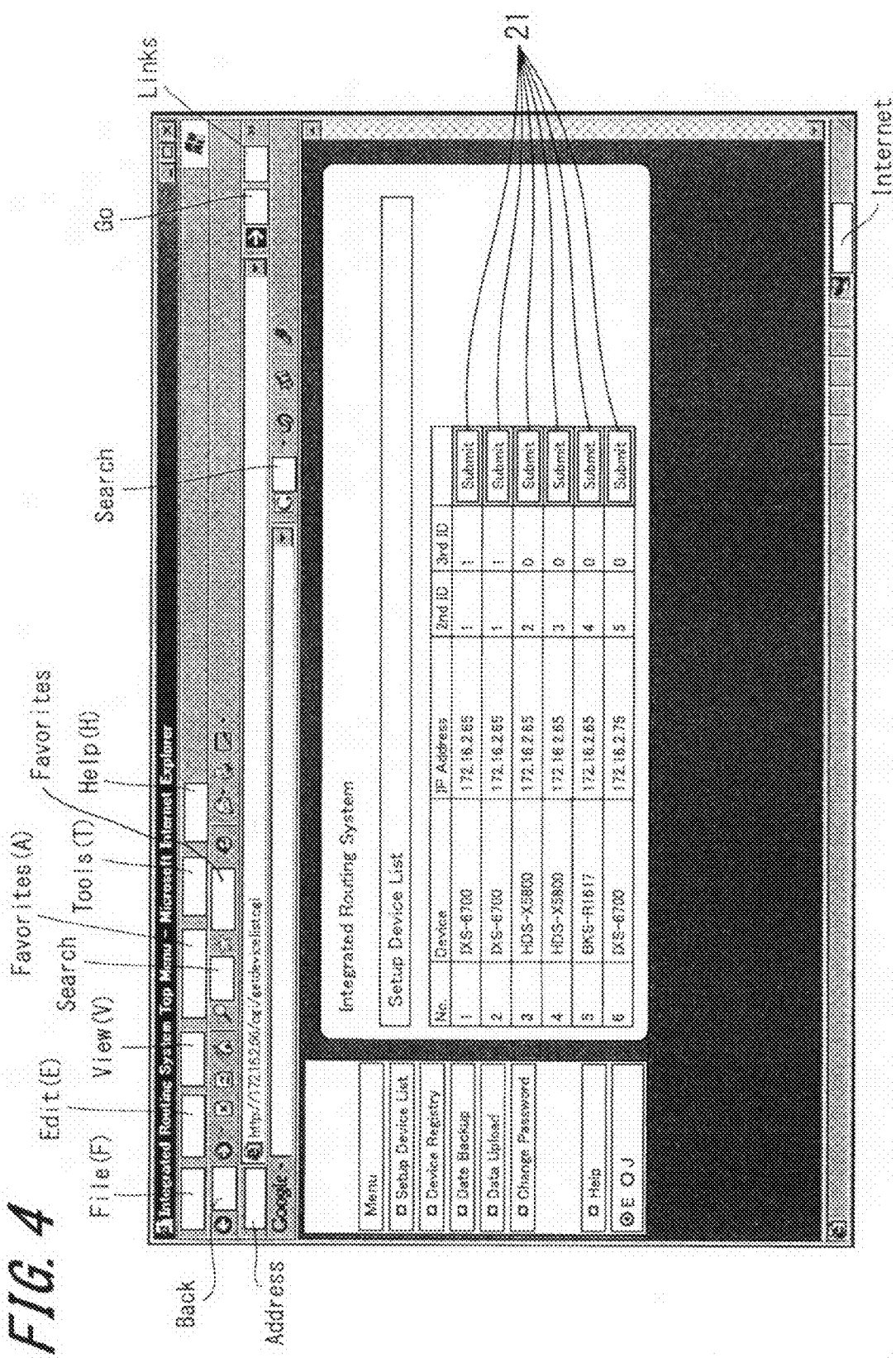
FIG. 4 is a diagram showing a Web page provided by a backup CPU.
Figure 5:
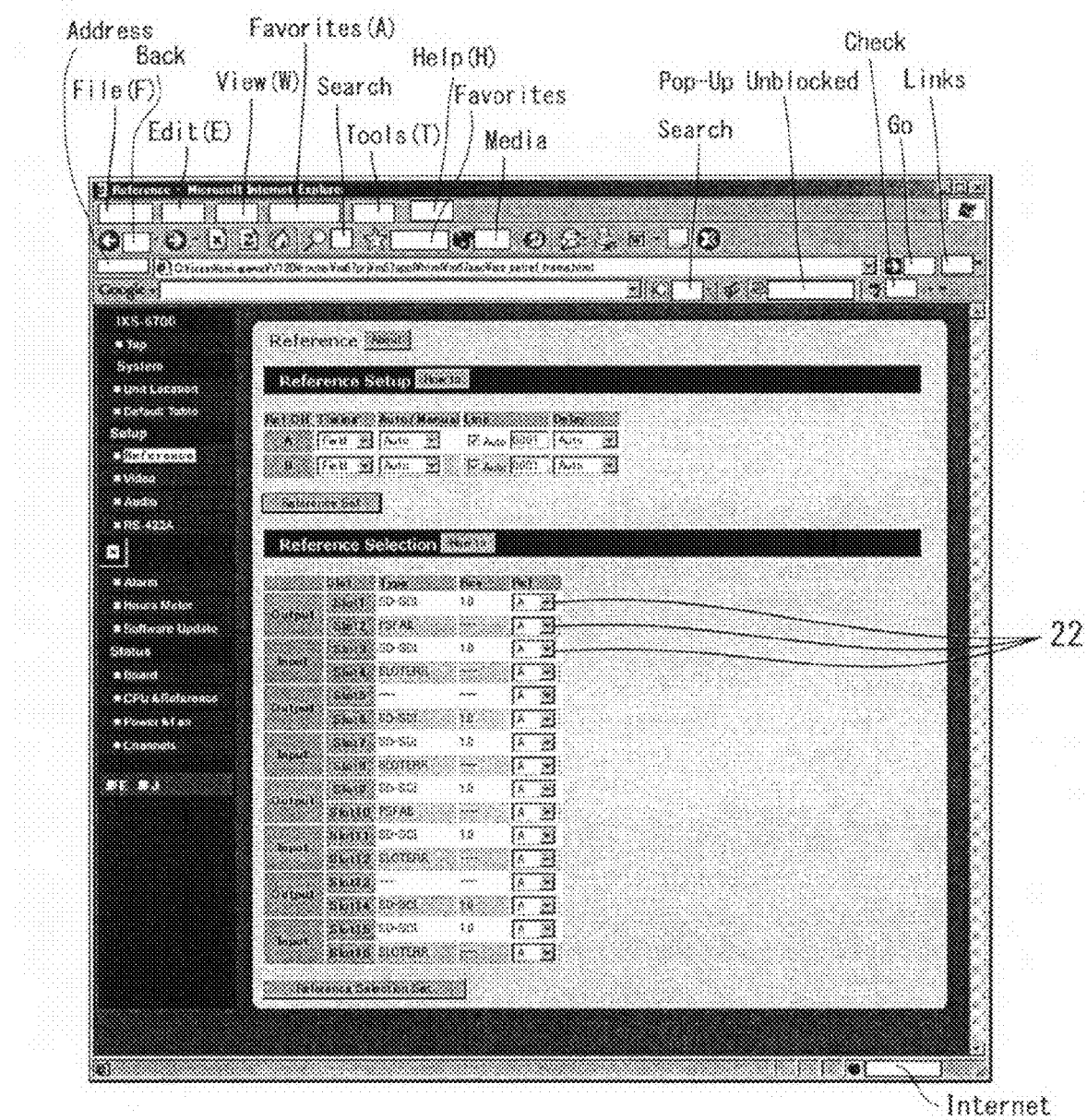
FIG. 5 is a diagram showing a Web page provided by the backup CPU.

FIGS. 4 and 5 are diagrams showing part of such Web pages. The Web page shown in FIG. 4 indicates a list screen displaying a list of the matrix switchers 1 through 4 and remote controller 5 which are connected to the S-BUS 7 so that an operator can select a setup object from the list. An IP address on the Ethernet®, an ID and a selection button 21 are displayed on the list screen for each of the matrix switchers and remote controller (displayed with a name of "Device" on the screen).

Device No. 1 is the control unit 12 (shown in FIG. 3) included in the matrix switcher 1 (shown in FIG. 1) of the primary station, and Device No. 2 is the switcher unit 11 (shown in FIG. 3) included in the matrix switcher 1 of the primary station. The switcher 11 and control unit 12 have the same Ip address and the same IDs (2nd ID and 3rd ID).

Devices No. 3 through No. 5 are the matrix switchers 3, 4, and remote controller 5 (shown in FIG. 1) which are the secondary stations not having an interface for Ethernet®. Since an IP address on Ethernet® is not given to those apparatuses, the same IP address as the primary station is indicated but IDs of those apparatuses are different from each other and also different from the ID of the primary station.

Device No. 6 is the matrix switcher 2 (shown in FIG. 1) that is the secondary station having an interface for Ethernet®. The indicated IP address is an IP address of the matrix switcher 2, and the ID thereof is different from the IDs of the primary station and other secondary stations.

The 2nd ID is used to discriminate the primary station from the secondary stations. The 3rd ID is used to discriminate a secondary station from a tertiary station (not shown in the system in FIG. 1) that is a lower-level station than the secondary station, and a value of the 3rd ID is 0 in the secondary station.

If Device No. 1 or No. 2 (matrix switcher 1 of the primary station) is selected on the list screen displayed on a personal computer or the like by a Web browser, a command not including the ID of the selected Device is transmitted to the IP address of the matrix switcher 1 from the Web browser. The command is a setup content data request command requesting the current setup content data of the selected Device in order to display a page of the setup screen for the selected Device. The backup CPU 14 transfers the setup content data request command to the main CPU 13 (shown in FIG. 3) and transmits the setup content data received from the main CPU 13 to the Web browser.

Further, if any of Devices No. 3 through No. 5 (matrix switchers 3, 4, or remote controller 5 that is the secondary station not having the interface for Ethernet®) is selected on the list screen, a command including the ID of the selected Device is transmitted to the IP address of the matrix switcher 1 from the Web browser as the above-described setup content data request command. The backup CPU 14 transfers the setup content data request command to the main CPU 13 and transmits the setup content data received from the main CPU 13 to the Web browser.

On the other hand, if Device No. 6 (matrix switcher 2 that is the secondary station having the interface for Ethernet®) is selected on the list screen, the above-described setup content data request command addressed to the IP address of the matrix switcher 2 is transmitted from the Web browser. The backup CPU 14 transfers the setup content data request command to the matrix switcher 2 via Ethernet® 8 and transmits the setup content data received from the matrix switcher 2 to the Web browser.

The Web page shown in FIG. 5 is one of the pages for the setup screen displayed using setup content data transmitted to the Web browser as described above. The setup screen shown in FIG. 5 is used for a matrix switcher to which "Reference" setup is executed among a plurality of setup items listed under "Setup" on the left side of the screen. The "Reference" setup is setting in which a channel of reference signal is selected among a plurality of channels (e.g., four channels) supplying reference signals from the outside of the matrix switcher as a signal to synchronize frames so that the switching in the switcher unit can be performed at a boundary between video frames. In the setup screen shown in FIG. 5, the switcher unit is divided into total sixteen areas (which are displayed as "Slot") and the channel of reference signal (channel such as A, B, C and D) is selected for each area using a pull-down menu 22.

It should be noted that an item of "Video" among a plurality of setup items listed under "Setup" on the left side of the screen is setting in which whether or not an input video signal is equalized is selected for each input channel. Further, "Audio" is setting in which whether or not an input audio signal is passed through a sampling rate converter is selected for each input channel and setting such as whether an output audio signal is made into a stereo signal or a monophonic signal. Although not illustrated, there are also pages of the setup screen for each of those setup items.

If setup operation for the matrix switcher 1 of the primary station is performed on the setup screen, a command not including the ID of the matrix switcher 1 (IDs of Devices No. 1 and No. 2 shown in FIG. 4) is transmitted as the setup command to perform the setup corresponding to the content of operation to the IP address of the matrix switcher 1 from the Web browser via the Ethernet® 8.

Further, if setup operation for the matrix switchers 3, 4, or remote controller 5, which is the secondary station not having the interface for Ethernet®, is performed on the setup screen, a command including the ID of the Device (IDs of Devices No. 3, No. 4 or No. 5 shown in FIG. 4) is transmitted as the setup command to perform the setup corresponding to the content of operation to the IP address of the matrix switcher 1 from the Web browser via the Ethernet® 8. The backup CPU 14 transfers those setup commands to the main CPU 13 (shown in FIG. 3).

On the other hand, if setup operation for the matrix switcher 2 of the secondary station having the interface for Ethernet® is performed on such setup screen, a setup command addressed to the IP address of the matrix switcher 2 is transmitted from the Web browser. The backup CPU 14 transfers the setup command to the matrix switcher 2 via the Ethernet®8, causing the matrix switcher 2 to perform the setup.

The main CPU 13 shown in FIG. 3 executes such processing as described in the following (1) through (5).

(1) Upon receiving a switching command addressed to the matrix switcher 1 of the primary station that is transmitted from the remote controller 5 via the S-BUS 7, the main CPU 13 switches a connection relation between the input signal lines and output signal lines in the switcher unit 11 (shown in FIG. 3) of the matrix switcher 1.

(2) Upon receiving a switching command addressed to the matrix switchers 2 to 4, or remote controller 5 of the secondary station that is transmitted from the remote controller 5 via the S-BUS 7, the main CPU 13 transfers the switching command to the addressed Device via the S-BUS 7.

(3) The main CPU 13 periodically acquires current setup content data of the matrix switchers 3, 4, and remote controller 5, which are the secondary stations not having the interface for Ethernet®, via the S-BUS 7. Subsequently, upon receiving the above-described setup content data request command from the backup CPU 14, the main CPU 13 identifies Device to which the setup content data request command is addressed among the matrix switchers 1, 3, 4, and the remote controller 5. The main CPU 13 identifies the Device based on presence or absence and numerical value of the ID (ID similar to those shown in the list screen in FIG. 4) that is included in the command.

In the case where the setup content data request command is addressed to the matrix switcher 1 of the primary station, the main CPU 13 transmits setup content data about the matrix switcher 1 which is stored in the memory included in the control unit 12 (shown in FIG. 3) to the backup CPU 14.

On the other hand, in the case where the setup content data request command is addressed to the matrix switchers 3, 4, or remote controller 5 that is the secondary station, the main CPU 13 again acquires the current setup content data of the addressed Device via the S-BUS 7 on the timing of receiving the command. Subsequently, if the data is obtained within a predetermined period (in the range of time that the Web browser may not cause time-out if the backup CPU 14 functioning as the Web server is kept waiting), the obtained data is converted into a protocol of Ethernet® (the protocol is SOAP based on XML but hereinafter referred to as XML protocol) and is transmitted to the backup CPU 14. On the other hand, if the data is not obtained within the predetermined period, the latest data having been obtained in periodical acquisition is converted into the XML protocol and transmitted to the backup CPU 14. Hence, the latest setup content data obtained within the period not causing time-out of the Web server can be displayed on the setup screen in FIG. 5.

(4) Upon receiving a setup command transmitted from the backup CPU 14 and addressed to the switcher unit 11 and control unit 12 of the matrix switcher 1 of the primary station, the main CPU 13 performs setup of the switcher unit 11 and the control unit 12. The Device that the setup command is addressed to is also identified with the presence or absence and numerical value of the ID included in the command.

(5) Upon receiving a setup command transmitted from the backup CPU 14 and addressed to the matrix switchers 3, 4, or remote controller 5, which is the secondary station not having the interface for Ethernet®, the main CPU 13 converts the setup command into the S-BUS protocol and transmits the setup command to the addressed Device via the S-BUS 7. The Device that the setup command is addressed to is also identified with the presence or absence and numerical value of the ID included in the command. In the S-BUS protocol, the setup command directly specifies an address on a table T shown in FIG. 2 and instructs a memory to store data in the specified address.

The main CPU 13 and the backup CPU 14 mutually monitor whether or not the other CPU is operating normally by referring to communication in the control unit 12 via the Ethernet® 15 (shown in FIG. 3), communication via the Ethernet® 8 (shown in FIG. 1), and a value of a register provided in the control unit 12 in order to store one-bit information indicating whether or not a failure occurs in the CPU 13 and the CPU 14. The backup CPU 14 executes the processing by functioning as the Web server such as those described above while the main CPU 13 is operating normally. However, when a failure occurs in the main CPU 13 (CPU 13 detects its failure and resets the CPU to restart), the backup CPU 14 terminates the Web server program to serve as the main CPU and executes the above-described (1) switching processing and (2) switching command transfer processing which have been executed by the CPU 13. The switching processing and switching command transfer processing are the processing for which high reliability and real-time responsiveness may be required for the matrix switcher 1 of the primary station.

Upon completing the restart (elapse of time from the reset to the completion of restart is approximately one minute, for example), the CPU 13 serves as the backup CPU in turn, operates the Web server program and transfers the setup content data request command and the setup command as described above to the CPU 14 (main CPU). The CPU 14 executes the above-described (3) setup content data transmission processing, (4) setup processing and (5) setup command transfer processing upon receiving the respective commands.

Further, in the case where a failure occurs in the CPU 14 afterward, the CPU 13 and the CPU 14 again interchange the roles of main and backup CPUs in a similar manner.

Figure 6:
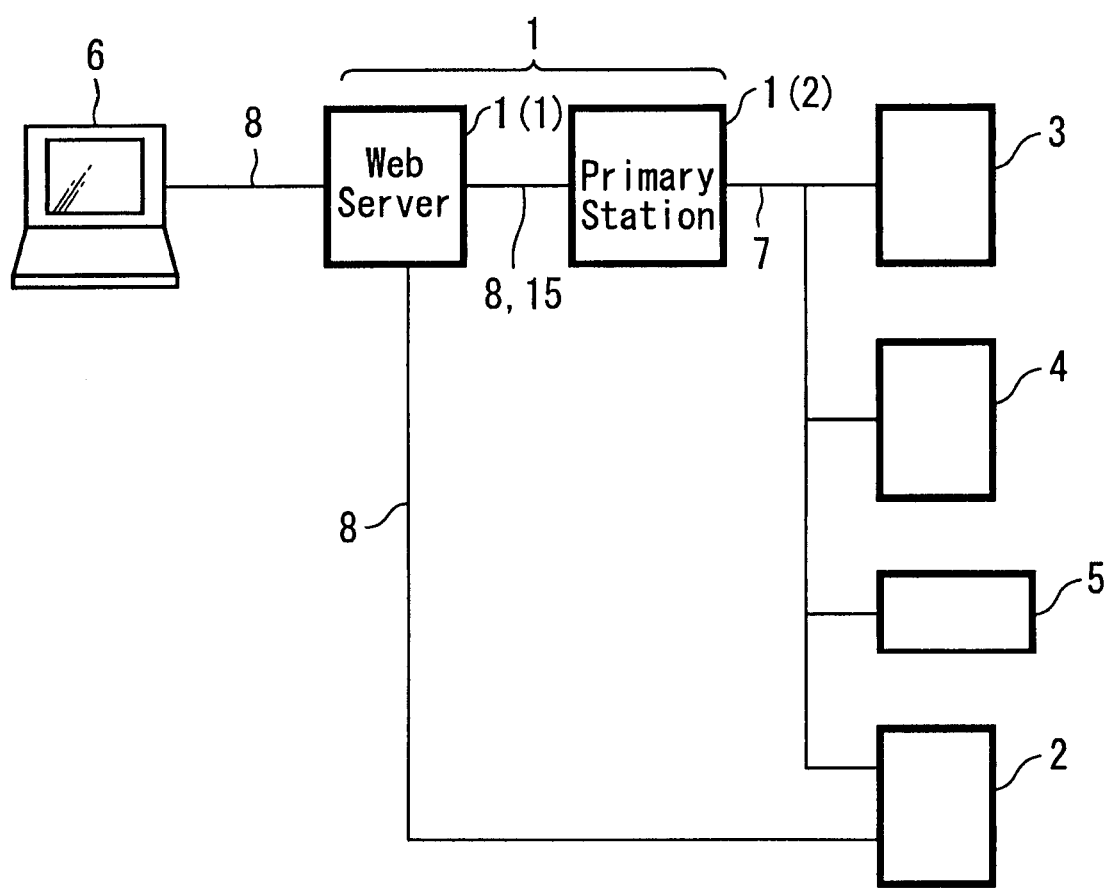
FIG. 6 is a diagram showing the system configuration in FIG. 1, in which a matrix switcher 1 is shown separately into a Web server and a typical primary station.

As described above, one of the two CPUs 13 and 14, which is presently operating as a backup CPU, executes the processing performed by functioning as the Web server in the matrix switcher 1 of the primary station. Therefore, the matrix switcher 1 can be divided functionally into the Web server and the typical primary station although the matrix switcher 1 is one apparatus. FIG. 6 is a diagram showing the configuration of the signal switching system in FIG. 1, in which the matrix switcher 1 is conceptually divided into a portion 1(1) that functions as a Web server and a portion 1(2) that functions as a typical primary station.

Communication between the Web server 1(1) and the personal computer 6 and communication regarding the setup processing between the Web server 1(1) and the matrix switcher 2 are performed via the Ethernet® 8. Communication between the Web server 1(1) and the primary station 1(2) is performed via the Ethernet® 15 (shown in FIG. 3) and the Ethernet® 8. Communication between the primary station 1(2) and each of the matrix switchers 3, 4, and remote controller 5, and communication regarding the switching processing between the primary station 1(2) and the matrix switcher 2 are performed via the S-BUS 7.

Next, an outline of the setup of the matrix switcher that is performed by operating the personal computer 6 in the signal switching system is specifically explained using such diagram as FIG. 6 in which the matrix switcher 1 is divided into the Web server 1(1) and the primary station 1(2).

In the case where an operator operates the personal computer 6 and selects Device No. 3 (matrix switcher 3 of the secondary station not having the interface for Ethernet®) on the page of the list screen shown in FIG. 4 displayed using the Web browser, pages of the setup screen related to the matrix switcher 3 are displayed. Upon selecting a channel of a reference signal for a certain Slot on the reference setup screen on the page shown in FIG. 5, a command is transmitted to the Web server 1(1) from the Web browser of the personal computer 6 via the Ethernet® 8, as shown (a) in FIG. 7. The command is a setup command to instruct the Slot to use a reference signal of the selected channel and is the XML protocol command including the ID of the matrix switcher 3

FIG. 8 is a diagram showing a full text of the setup command addressed to the secondary stations, and a tag to which an arrow (A) is appended specifies a channel of the reference signal to be used. In addition, a tag to which an arrow (B) is appended shows the IDs of the secondary station. The IDs described here are second="0", third="0", but the IDs are second="2", third="0" in the case of the matrix switcher 3, as the values of the 2nd ID and 3rd ID are respectively set to 2 and 0 in the list screen shown in FIG. 4.

On the other hand, FIG. 9 shows the same setup command addressed to the matrix switcher 1 (primary station 1(2)), and the tag to which the arrow (A) is appended is the same tag as that in FIG. 8. A tag showing the ID such as the one to which the arrow (B) is appended in FIG. 8 is not included in this setup command.

The Web server 1(1) transfers the setup command of the XML protocol received from the Web browser to the primary station 1(2) via the Ethernet® 15, which is shown as (b) in FIG. 7.

Upon receiving the setup command, the primary station 1(2) stores data indicating the selected channel at the address in a table T1 for the matrix switcher 3 for the channel data of the reference signal on the Slot, shown as (c) in FIG. 7. The table 1 is one of tables T1, T2 and T3 (tables in the primary station explained using FIG. 2) for the matrix switchers 3, 4, and remote controller 5, which are provided in the primary station 1(2).

Further, the primary station 1(2) converts the setup command into the S-BUS protocol and transfers the converted setup command to the matrix switcher 3 via the S-BUS 7, which is shown as (d) in FIG. 7. In the S-BUS, the setup command is shown as "02 84 1F A0 22" in hexadecimal notation, for example. The command indicates the following contents described sequentially from the top. 2nd ID of the secondary station is "2", to which a data transfer command "84" is given. The data transfer command is transmitted from the primary station and gives an instruction to overwrite the data on a specific address in the memory of the secondary station. Specifically, the command instructs the address of "1F A0" (address where the data about the channel of the reference signal for the Slot selected on the setup screen in FIG. 5 should be stored) to be overwritten with data "22" (data indicating the channel selected on the setup screen in FIG. 5).

In response to the setup command, the matrix switcher 3 stores data showing the selected channel in a table T of the matrix switcher 3 (table of the secondary station explained using FIG. 2) at an address for channel data on the reference signal for the Slot, which is shown as (e) in FIG. 7. As described above, the reference setup for a certain Slot of the matrix switcher 3 using the personal computer 6 is completed.

According to the above-described signal switching system, both the setup operations of the matrix switchers 1, 2 having the interface for Ethernet® and the matrix switchers 3, 4, and remote controller 5 not having the interface for Ethernet® can be performed using a Web browser in the personal computer 6 via the Ethernet® 8.

In a typical backup system including a main CPU and a backup CPU, the backup CPU only traces data handled in the main CPU so that the backup CPU prepares for a failure that may occur in the main CPU when the main CPU is operating normally. Therefore, the backup CPU is not executing high load processing although the backup CPU has the same processing capacity as the main CPU. According to the embodiment of the present invention, while one of the CPUs 13 and 14 is normally operating as a main CPU in the control unit 12 of the matrix switcher 1 that is the primary station, the remaining backup CPU functions as the Web server having high load. Accordingly, the main CPU can execute switching/switching-command-transfer processing while maintaining high reliability and real-time responsiveness, and switching/switching-command-transfer processing may not be interrupted even when a failure occurs in the backup CPU functioning as the Web server due to a load of the processing.

Further, a backup CPU is provided typically. In addition, there is no need for the CPUs 13, 14 to be prepared as a CPU having high processing capacity and executing both the switching/switching-command-transfer processing and the processing performed by functioning as the Web server. Therefore, the matrix switcher 1 is prevented from being expensive although having the Web server function.

Accordingly, the matrix switcher 1 that can economically execute switching/switching-command-transfer processing, for which high reliability and real-time responsiveness are required, and processing performed by functioning as the Web server is provided. The matrix switcher 1 can perform a setup operation of both the matrix switchers 1, 2 having an interface for the Ethernet® and the matrix switchers 3, 4 and remote controller 5 not having the interface for Ethernet® using a Web browser in the personal computer 6 via Ethernet® 8.

It should be understood by those skilled in the art that various modifications, combinations, sub-combinations and alterations may occur depending on design requirements and other factors insofar as they are within the scope of the appended claims or the equivalents thereof.

What is claimed is:

1. A matrix switcher including a switcher unit having connection switches respectively provided at intersections formed by a plurality of input signal lines and a plurality of output signal lines and a control unit configured to control the switcher unit, the control unit comprising:

a main controller and a backup controller, each of which has an interface for a general-purpose network and an interface for a dedicated communication line, wherein during normal operation of the main controller, the backup controller only operates a Web server program to transfer a setup command to the main controller upon receiving the setup command, addressed to the matrix switcher and/or another matrix switcher not having the interface for the general-purpose network, from a Web browser via the general-purpose network, and wherein during normal operation of the main controller, the main controller only executes (a) processing of switching a connection relation between the input signal lines and output signal lines in the switcher unit upon receiving a switching command addressed to the matrix switcher via the dedicated communication line;

(b) processing of transferring a switching command to another matrix switcher via the dedicated communication line upon receiving the switching command addressed to another matrix switcher via the dedicated communication line;

(c) processing of setting up the matrix switcher upon receiving from the backup controller the setup command addressed to the matrix switcher; and (d) processing of converting the setup command into a protocol of the dedicated communication line and transferring the setup command to another matrix switcher via the dedicated communication line upon receiving from the backup controller the setup command addressed to another matrix switcher not having the interface for the general-purpose network.

2. The matrix switcher according to claim 1, wherein the backup controller terminates the operation of the Web server program and executes the switching and switching command transfer processing having been executed by the main controller, when a failure occurs in the main controller.

3. The matrix switcher according to claim 1, wherein
the backup controller identifies a matrix switcher to which the received command is addressed among the matrix switcher and another or a plurality of other matrix switchers not having the interface for the general-purpose network, based on whether or not an identifier for identifying another matrix switcher is included in the command transmitted to an address given to the backup controller on the general-purpose network.

4. The matrix switcher according to claim 1,
wherein the main controller periodically acquires current setup content data on another matrix switcher not having the interface for the general-purpose network via the dedicated communication line, and acquires the current setup content data on another matrix switcher via the dedicated communication line when a request for the setup content data is received from the backup controller; and
wherein the main controller converts the acquired data into a protocol for the general-purpose network and transmits the result to the backup controller in the case where data is acquired within a predetermined period upon receiving the request, and converts the latest periodically acquired data into the protocol for the general-purpose network and transmits the result to the backup controller in the case where data is not acquired within the predetermined period upon receiving the request.

5. A method of controlling a matrix switcher including a switcher unit having connection switches respectively provided at intersections formed by a plurality of input signal lines and a plurality of output signal lines and a control unit configured to control the switcher unit, in which the control unit includes a main controller and a backup controller, each of which has an interface for a general-purpose network and an interface for a dedicated communication line,
the method of controlling the matrix switcher comprising the steps of:
operating during normal operation of the main controller by the backup controller only a Web server program to transfer a setup command to the main controller upon receiving the setup command addressed to the matrix switcher and/or another matrix switcher not having the interface for the general-purpose network from a Web browser via the general-purpose network; and
during normal operation of the main controller, the main controller only performs the steps of
(a) switching by the main controller a connection relation between the input signal lines and output signal lines in the switcher unit upon receiving a switching command addressed to the matrix switcher via the dedicated communication line;
(b) transferring by the main controller a switching command to another matrix switcher via the dedicated communication line upon receiving the switching command addressed to another matrix switcher via the dedicated communication line;
(c) setting up by the main controller the matrix switcher upon receiving from the backup controller the setup command addressed to the matrix switcher; and
(d) converting by the main controller the setup command into a protocol of the dedicated communication line and transferring by the main controller the setup command to another matrix switcher via the dedicated communication line upon receiving from the backup controller the setup command addressed to another matrix switcher not having the interface for the general-purpose network.

6. The method of controlling a matrix switcher according to claim 5, further comprising the step of
terminating the operation of the Web server program and executing the switching and switching command transfer processing by the backup controller, the processing having been executed by the main controller, when a failure occurs in the main controller.

7. The method of controlling a matrix switcher according to claim 5, further comprising the step of
identifying by the backup controller a matrix switcher to which the received command is addressed among the matrix switcher and another or a plurality of other matrix switchers not having the interface for the general-purpose network, based on whether or not an identifier for identifying another matrix switcher is included in the command transmitted to an address given to the backup controller on the general-purpose network.

8. The method of controlling a matrix switcher according to claim 5, further comprising the steps of
acquiring periodically by the main controller current setup content data on another matrix switcher not having the interface for the general-purpose network via the dedicated communication line;
acquiring by the main controller the current setup content data on another matrix switcher via the dedicated communication line when a request for the setup content data is received from the backup controller;
converting by the main controller the acquired data into the protocol for the general-purpose network and transmitting by the main controller the result to the backup controller in the case where data is acquired within a predetermined period upon receiving the request; and
converting by the main controller the latest periodically acquired data into the protocol for the general-purpose network and transmitting by the main controller the result to the backup controller in the case where data is not acquired within the predetermined period upon receiving the request.

* * * * *